United States Patent [19]
Yokosawa

[11] Patent Number: 4,841,390
[45] Date of Patent: Jun. 20, 1989

[54] DIGITAL SIGNAL REPRODUCING APPARATUS

[75] Inventor: Seiichi Yokosawa, Saitama, Japan

[73] Assignee: Pioneer Electronic Corporation, Tokyo, Japan

[21] Appl. No.: 104,019

[22] Filed: Oct. 5, 1987

[30] Foreign Application Priority Data

Oct. 3, 1986 [JP] Japan .................. 61-234480
Oct. 6, 1986 [JP] Japan .................. 61-236245
Oct. 7, 1986 [JP] Japan .................. 61-237247
Oct. 8, 1986 [JP] Japan .................. 61-238153
Nov. 7, 1986 [JP] Japan .................. 61-264039

[51] Int. Cl.⁴ .................. G11B 21/10; G11B 5/09
[52] U.S. Cl. .................. 360/77.14; 360/51
[58] Field of Search .................. 360/77, 51

[56] References Cited
U.S. PATENT DOCUMENTS
4,714,971 12/1987 Sigiki et al. .................. 360/32

Primary Examiner—Vincent P. Canney
Attorney, Agent, or Firm—Sughrue, Mion, Zinn, Macpeak & Seas

[57] ABSTRACT

A digital signal reproducing apparatus which reproduces digital PCM audio signals recorded on a recording medium in the form of single helical tracks. The signals recorded on the recording medium are reproduced by a rotary head. In order to prevent the erroneous detection of an ATF (Automatic Track Finding) signal, block addresses recorded in subcodes and PCM areas are read into a system counter which is used for forming a window for detecting ATF sync signals, and then the count value of the system counter is compensated for.

11 Claims, 6 Drawing Sheets

DIGITAL SIGNAL REPRODUCING APPARATUS

BACKGROUND OF THE INVENTION

The present invention relates to a digital signal reproducing apparatus suitable for reproducing digital PCM audio signals that have been recorded in the form of single helical tracks on a recording medium, one track being formed per unit time, with a rotary head.

A technique is known in which audio signals are recorded on magnetic tape with a helical scanning rotary head in the form of helical tracks, one track being formed per unit time, and reproduced thereafter. A digital signal record/reproduce apparatus known as R-DAT (rotary head type digital audio tape recorder) has been designated for recording audio signals as PCM signals and thereafter reproducing the same.

A format of tracks to be recorded in the actual system of R-DAT has a pattern as shown in FIG. 4(a), in which each of MARGIN, PLL and POSTAMBLE has a frequency of $\frac{1}{2} f_M$ ($f_M = 9.4$ MHz) and IBG a frequency of $1/6 f_M$. Each of SUB and PCM is composed of a plurality of blocks as shown in FIG. 4(b). SYNC is composed of 10 bits in which 9 bits are fixed with the remainder assuming various patterns depending upon the place and audio signals. SUB consists of a cyclic pattern of 8 such blocks, and PCM 128 blocks. The numerals given in FIG. 4(a) represent the numbers of blocks occupied by the respective regions. ATF-1 between SUB-1 and PCM and ATF-2 between PCM and SUB-2 are each a region (ATF=automatic track finding) provided for ensuring that tracking control, i.e., control for allowing a rotary head to correctly scan the recorded tracks during reproduction, can be accomplished by means of the output of the head without employing any special head.

In R-DAT, PCM signals compressed on a time base are recorded in the form of helical tracks on magnetic tape by means of two rotary heads. Instead of providing a guard band between adjacent tracks, a tracking pilot signal is recorded both at the beginning and at the end of each track in a region independent of the area in which the PCM signals are recorded. During reproduction, the recorded tracks are scanned with a rotary head having a scanning width larger than the width of each track, and the reproduction output of the pilot signals from the two tracks adjacent to the track being scanned is used to control the tracking of the rotary head.

The track pattern for ATF is specified as shown in FIG. 5 and is hereinafter described with reference to the case where a drum having diameter of 30 mm is rotating at 2,000 rpm with the tape wound at an angle of 90° to the drum.

ATF-1 and ATF-2 located in the front and rear portions, respectively, of each track have a low-frequency (small azimuth-effect) signal $f_1$ as a tracking pilot signal. This signal is used for the purpose of detecting the levels of crosstalk resulting from the two tracks adjacent to the track being reproduced, so as to obtain the difference between the levels of such crosstalk as a tracking error signal. A low-frequency signal of $f_M/72$ (130 kHz) is used as the pilot signal $f_1$.

In each Of ATF-1 and ATF-2 is recorded a sync signal for identifying the location at which the pilot signal $f_1$ is recorded. In the presence of crosstalk, the sync signal is unable to distinguish the on-track from adjacent tracks, so it is selected in such a way that it not only has a frequency capable of producing an azimutheffect but also affords a pattern that is not possessed by the PCM signal. If the head having a + (plus) azimuth is designated A and the head having a −(minus) azimuth is designated B, two different sync signals are provided for the purpose of distinguishing head A from head B. Stated more specifically, a sync 1 signal $f_2$ having a frequency of $f_M/18$ (=522 kHz) and a sync 2 signal $f_3$ having a frequency of $f_M/12$ (=784 kHz), associated with heads A and B, respectively, are recorded in predetermined positions.

In R-DAT which does not employ an erase head, a new signal is written over the previously recorded signal. In order to enable this "overwrite" mode, an erase signal $f_4$ having a frequency of $f_M/6$ (=1.56 MHz) is recorded at a predetermined position for erasing the previously recorded pilot signal $f_1$, sync 1 signal $f_2$, and sync 2 signal $f_2$.

The pilot signals for ATF are located at different positions on the on-track and the two adjacent tracks and the level of the pilot signal on the on-track (i.e., the track being scanned) differs on a time basis from the level of each of the pilot signals on the adjacent tracks, so that the three different levels can be samples independently of each other.

Five blocks are assigned to each of the ATF regions, ATF-1 and ATF-2, and the pilot signal $f_1$ is recorded in two of these blocks. The sync signal $f_2$ is recorded in an area covering 1 or 0.5 block from the center of the position in which one of the two adjacent tracks is recorded. The pilot signal $f_1$ on the other adjacent track is recorded in such a way that its center is positioned two blocks after the beginning of the sync signal recorded on the on-track. A sync signal composed of one block is assigned to an odd-number frame, and a sync signal composed of 0.5 blocks is assigned to an even-number frame.

As described above, the sync signals to be recorded in the ATF region have different frequencies depending upon which head is used in scanning, and these sync signals also have different recording lengths in odd-number frames and even-number frames. This design enables four consecutive tracks to be distinguished from one another since they are provided with different ATF regions. The pattern of ATF regions is of a 4-track completed type in which it is cyclically repeated for every 4 tracks.

When magnetic tape in which signals have been recorded in the format shown in FIG. 4(a) is played back with a rotary head, an RF signal of the type shown in FIG. 6(a) is reproduced from the head. If this RF signal is obtained by playback of a track with the odd-number frame (A) shown in FIG. 5, it may be passed through a bandpass filter (BPF) of 130 kHz to obtain a pilot signal $f_1$ as shown in FIG. 6(b).

The signal in zone I is due to the pilot signal on the on-track, and those in zones II and III result from the crosstalk of the pilot signal on a track with the odd-number frame (B) and a track with the even-number frame (B), respectively. If the rotary head were scanning the on-track correctly, the envelope levels of zones II and III, or the values of $V_{II}$ and $V_{III}$ indicated in FIG. 6(c) should be equal to each other. However, if a tracking deviation occurs, $V_{II}$ is not equal to $V_{III}$ ($V_{II} \neq V_{III}$) and the amount and direction of the deviation of the rotary head with respect to the on-track can be determined by the magnitude and polarity of the difference between $V_{II}$ and $V_{III}$. Therefore, by actuating a capstan servo according to the difference between $V_{II}$ and $V_{III}$ to effect fine adjustment of the tape speed, the rotary head can be controlled to travel correctly on the on-track. To this end, it is necessary to correctly detect a certain sync signal at a predetermined position and to form windows for achieving correct detection of various signals that are recorded at predetermined positions.

In order to form windows for various recorded signals in R-DAT, a data sync is detected and a system counter for window formation is operated with the detected data sync used as a reference. However, the detection of data sync alone is not sufficient for the purpose of correctly detecting the running position of the tape. For instance, a dropout sometimes renders it impossible to correctly detect the subcode or PCM data sync from the first track, and erroneous detection of the data sync can occur if there is a clock mismatch or if a slight offset occurs in the threshold point. Furthermore, the slightest fluctuation in the RF signal can also cause erroneous detection of the data sync. Therefore, if the data sync is to be used as a reference for the operation of the system counter, the width of the window used to achieve error-free detection of various recorded signals must inevitably be increased and it becomes difficult to form windows having an appropriate width.

Another reason for the necessity to employ wide windows in the prior art R-DAT is that the width of data sync windows is determined solely on the basis of a reference clock produced from a crystal oscillator. As a further problem, the reliability of the system counter operating for window formation during data reproduction is largely dependent on the conditions of the tape running.

The data sync is inherently prone to erroneous detection on account of such factors as clock mismatching and the occurrence of small dropouts and noise, and the chance of erroneous detection is increased if wide windows are formed. Potential offsetting due to failure to closely follow the data must also be taken into account. The inherent nature of a sync window is such that if it is too narrow, the sync signal to be detected may be missed and that if it is too broad, erroneous detection can occur.

A PLL clock produced by extracting a clock component from a data train is capable of closely following the data, but in R-DAT, data recording or reproduction alternates with signals that have a different character from the data (e.g., signals whose frequency is completely fixed). Therefore, comparatively wide sync windows must be formed so that they can be used as a reference for data reading but then, this reduces the operational precision.

In a replay mode of R-DAT, the data region recorded on each track in accordance with a predetermined format and the non-data region are successively reproduced. During reproduction of the data region, a PLL system counter operates in response to a clock that is extracted from a data train by a PLL circuit and which is capable of closely following the data, and the operation of this PLL system counter starts at the time when the data sync that serves as a reference for reading the data recorded on the predetermined format has been detected. During reproduction of the non-data region, a crystal system counter is operated in response to a clock from a crystal oscillator. In this way, the PLL system counter and the crystal system counter detect the actual positions at which the data region and the non-data region are respectively reproduced from the tape. However, when the mode of reproduction is switched from the non-data region to the data region, both system counters will stop operating for a certain period of time. It has been difficult to form a windowing this period that has an appropriate width for correctly detecting and protecting the data sync or the tracking ATF sync.

The closer the width of the window is to the duration of a signal of interest, the more immune the system is to erroneous detection that may be caused on account of extraneous factors such as noise, and the better the S/N ratio that can be attained on a time base. However, if the duration of the window is too strictly determined in consideration of jitter and other factors, a disadvantage will occur in that the window with such a small tolerance on a time basis prevents the reading of data that could theoretically be read. Furthermore, as shown in FIG. 4(a), R-DAT employs a track format consisting of a sequence of MARGIN, PLL, SUB-1, POST AMBLE, IBG, ATF-1, IBG, PLL and PCM. Since MARGIN and PLL have a frequency of $\frac{1}{2} f_M$, they can theoretically be distinguished from the data sync for SUB-1 and correct data detection should be possible. In fact, however, the data becomes indistinguishable from the data sync on account of jitter, dropouts and other extraneous factors, and if a certain data sync is erroneously detected, the error may affect one block of data. In order to avoid this problem, the data must be protected with an appropriately set window.

As for the ATF region, the IBG is present on both sides and the two regions can theoretically be distinguished from each other since IBG has a frequency of $1/6 f_M$. But in this case, too, some signals may be erroneously identified as SY2 (sync Signal for head A) or as SY3 (sync signal for head B) and there is at least the possibility that SP1, a sampling signal for actuating the ATF operation, will be generated. Furthermore, if erroneous detection occurs after "overwriting", SP2 may be generated two blocks after the generation of SP1. It is therefore necessary to protect the AFT by setting an appropriate window.

For the reasons described above, the sync window should be set in such a way that its width is the closest possible to the duration of a signal of interest, but the data that can be used to set a window will vary with the data that has been read after head switching. Ideally, data should be read in a prescribed order but if a dropout should occur in the subcode area to make it impossible to read data in SUB-1, it is desired to read data in ATF-1 and use it as a reference signal for window setting; if data cannot be read in SUB-1 or ATF-1, data is desirably read in PCM and used as a reference signal for window setting. If the failure to read data occurs in other regions, there is no need to take special provisions because the data read in by such provisions will not make any sense in almost all situations.

The R-DAT described above is designed so that a certain time exists between head switching and the actual reproduction of an RF signal. A pulse generator (PG) generates a head switching pulse (PG pulse) as the rotary drum that is equipped with two heads spaced at an angular distance of 180 rotates on the track format to achieve data reproduction in the order of SUB-1, ATF-1, PCM, ATF-2, and SUB-2. With a PG pulse generated in such manner being used as a reference, a sync window is set that it will have a width so that is equal to the duration of time over which a certain signal to be reproduced would actually exist.

However, in this case, too, the interval between the generation of a PG pulse and the actual production of an RF signal may be unexpectedly long or may fluctuate in the presence of jitter, and if a dropout occurs, a desired signal may be absent from the position where it should appear. Under these circumstances, the very fact that a sync window exists prevents reading of data that could theoretically be read.

SUMMARY OF THE INVENTION

An object, therefore, of the present invention is to provide a digital signal reproducing apparatus that allows the block address recorded in the subcode and PCM areas to be read into a system counter and which forms sync windows with the system counter being properly compensated to prevent erroneous detection of an ATF sync signal.

Another object of the present invention is to provide a digital reproducing apparatus that controls the width of a data sync protecting window in accordance with the state of reproduction to reduce the probability of detection of an erroneous data sync and to prevent the true sync signal to be missed because of the small window width, thereby ensuring that ensuing data can be correctly read.

Still another object of the present invention is to provide a digital signal reproducing apparatus that operates a system counter with clocking switched between the duration of time over which the data area on the track format is reproduced and that over which the non-data area is reproduced.

A further object of the present invention is to provide a digital signal reproducing apparatus in which an ATF sync detecting and protecting window is opened if no data sync can be detected until after a prescribed value is counted by either a data protecting counter that operates in response to a clock from a crystal oscillator or a block counter that protects an ATF sync during signal processing for tracking purposes.

A still further object of the present invention is to provide a rotary head type digital signal reproducing apparatus in which windows for an ATF sync signal and a data sync signal are opened to permit the reading of both signals at least in the period between actual production of an RF signal and the first reading of data, thereby ensuring that certain data to be read is read without failure.

DESCRIPTION OF THE PREFERRED EMBODIMENTS

The preferred embodiments of the present invention are hereinafter described with reference to the accompanying drawings.

Figure 1:
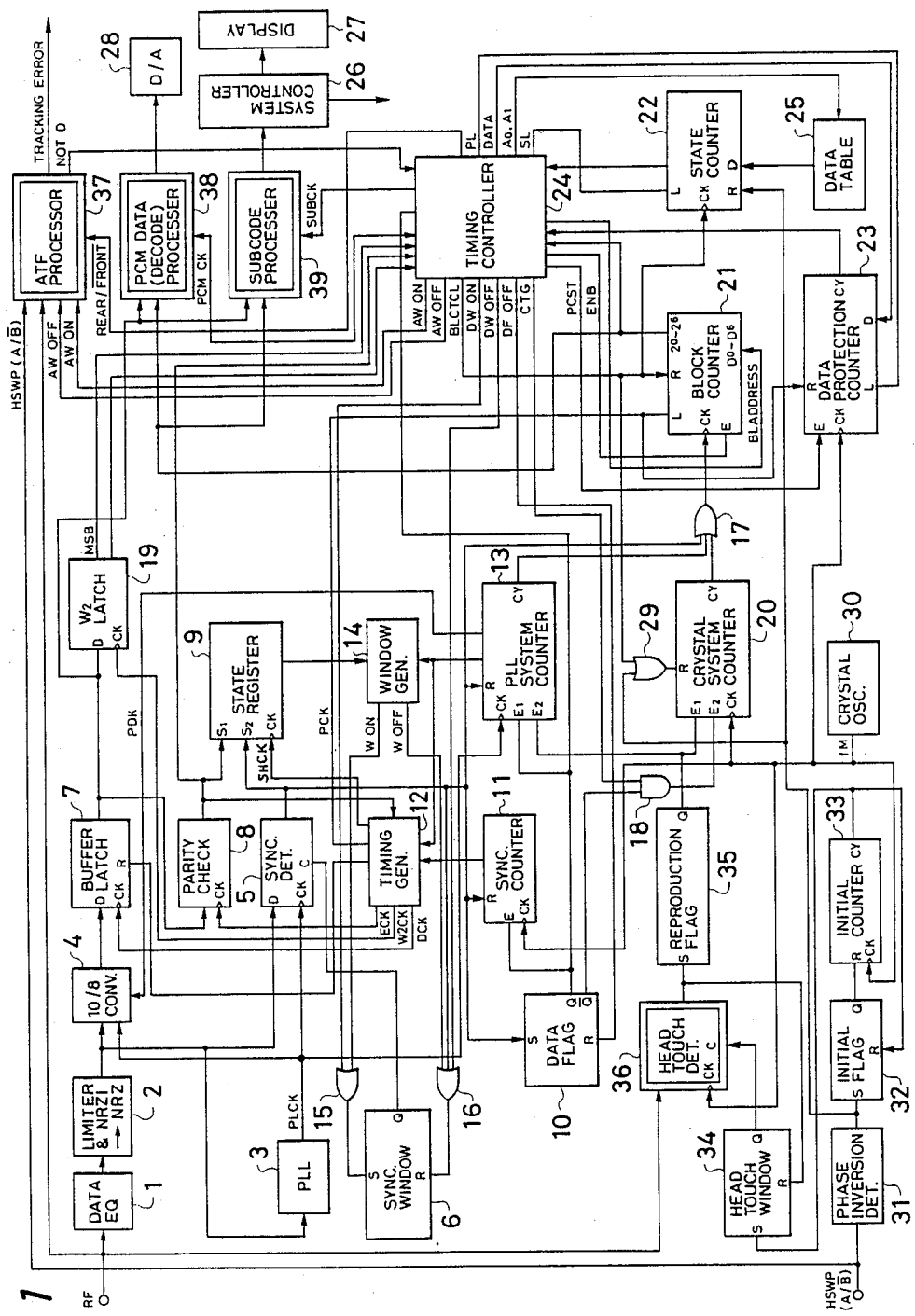
FIG. 1 is a block diagram of a block address processing circuit that is used in a digital signal reproducing apparatus according to one embodiment of the present invention.

FIG. 1 is a block diagram of a block address processing circuit that is used in a digital signal reproducing apparatus according to one embodiment of the present invention. As shown, a reproduced RF signal is supplied to a data equalizer 1, a head touch detector circuit 36 for detecting the production of the RF signal, and to an ATF processing circuit 37 that supplies a tracking error signal to a capstan servo system. In the data equalizer 1, the 1.2–2.4 MHz component in the frequency band of digital data is emphasized and supplied to a limiter NRZI→NRZ converter circuit 2. In the converter circuit 2, the RF signal is converted to a digital signal that has either a high "H" level when the input RF signal is greater than a predetermined threshold value, or a low "L" level when it is smaller than the threshold. Thereafter, the circuit 2 converts an NRZI signal to an NRZ signal, which is supplied as an output to a PLL circuit 3, a 10/8 converter (demodulator) circuit 4, and a data sync detector circuit 5.

The PLL circuit 3 extracts a clock component from a data train and outputs PLCK (=9.4 MHz±Δ) which is a clock that closely follows the data. The PLCK output from PLL circuit 3 is supplied to the 10/8 converter circuit 4, the CK terminal of the data sync detector circuit 5 and the CK terminal of a PLL system counter 13. In response to this PLCK, the channel data train supplied to the 10/8 converter circuit 4 from the circuit 2 is converted to an 8-bit data for every 10 bits and supplied to a buffer latch 7. In the data signal sync detector 5, the data train supplied at the D terminal is compared with a 9-bit fixed pattern in response to the PLCK, and if coincidence is established, the circuit 5 produces a "H" level output. The sync pattern is composed of 10 bits, the first being dependent on previous data while the remaining 9 bits form a fixed pattern. The data sync detector circuit 5 is supplied at its control terminal C with the Q output from a sync window flip-flop 6. The circuit 5 will detect the sync pattern only when the control terminal C is at a "h" level. Otherwise, it will be disabled. The output from the circuit 5 is supplied to the S terminal of a data flag flip-flop 10, the R terminal of a synchronous counter 11, the R terminal of the PLL system counter 13, the S$_2$ terminal of a state register 9, and to three-input OR gates 16 and 17.

The sync window flip-flop 6 is supplied with the output of a two-input OR gate 15 and the output of the three-input OR gate 16 at its S and R terminals, respectively, and the Q output of flip-flop 6 is supplied to the control, terminal C of the data sync detector circuit 5. The circuit 5 detects a sync pattern from the data train when the Q output from flip-flop 6 is at a "H" level and is disabled when the Q output is at a "L" level. In other words, the sync window flip-flop 6 is a flip-flop used to control the sync detecting operation of the circuit 5.

The data converted to an 8-bit NRZ signal in the 10/8 converter circuit 4 is fed into the buffer latch 7 in response to the DCK supplied from a timing generator circuit 12. Up to the stage of 10/8 converter circuit 4, data is transmitted in response to the PLCK which is output by PLL circuit 3. In buffer latch 7, however, data is received in response to a clock synchronous with the output ($f_M$) of a crystal oscillator 30 that generates 9.4 MHz signal (the rate of transmission of channel bit data in R-DAT). Therefore, the buffer latch 7 and components at subsequent stages are operated in synchronism with the output ($f_M$) of the crystal oscillator 30.

The output of buffer latch 7 is supplied to each of a parity check circuit 8, a $W_2$ latch 19, a PCM data processing, circuit 38 and a subcode processing circuit 39. Parity check circuit 8 performs a format calculation based on $W_1 + W_2 = P$ and produces a "H" level output if the data is correct, and a "L" level output if the data is not correct. The output of circuit 8 is supplied to the $S_1$ terminal of state register 9, timing generator 12 and a timing controller 24.

The $S_1$ terminal of state register 9 is supplied with the output of parity check circuit 8, the $S_2$ terminal with the output of data sync detector circuit 5, and the CK terminal with the SHCK signal from timing generator 12. A temporary memory latch in state register 9 is held at a "H" level when a rising edge occurs at its $S_1$ and $S_2$ terminals. When the CK terminal the timing generator 12, the state of the latch is read of register 9 is supplied with clock signal SHCK from timing generator 12, the state of the latch is read into the internal register and shifted so that the temporary memory latch is cleared. In response to input $S_1$, $Q_{11}$, $Q_{12}$ and $Q_{13}$ are sequentially shifted and produced as outputs, and in response to input $S_2$, $Q_{21}$, $Q_{22}$ and $Q_{23}$ are sequentially shifted and produced as outputs. In either case, SHCK is used as a clock signal. Each of these outputs is supplied to a window generator circuit 14.

The S terminal of data flag flip-flop 10 is supplied with the output from the data sync detector circuit 5, and the R terminal is supplied with a DF OFF signal from the timing controller 24. The Q output from flip-flop 10 is supplied to the E terminal of synchronous counter 13 which operates in response to the $f_M$ clock signal from the crystal oscillator 30. The Q output of flip-flop 10 is also supplied to the $E_1$ terminal of the PLL system counter 13 and an input of the timing controller 24. The data flag flip-flop 10 is a flag that turns on when a data sync is detected for subcode 1, PCM and subcode 2.

The PLL system counter 13 performs a 1/10 frequency division and a 1/36 frequency division for a total of 1/360 frequency division and produces a carry output from 1/360. The PLL system counter 13 also produces a PDK output as a 1/10 carry which performs data and block control and is supplied to the 10/8 converter circuit 4. The carry output CY from the PLL system counter 13 is supplied as an input to the three-input OR gate 17.

The window generator circuit 14 is supplied with the output from the state register 9 and the output from the PLL system counter 13. A W ON output from the window generator 14 is supplied as an input to the two-input OR gate 15, and a W OFF output is supplied as an input to the three-input OR gate 16. The two-input OR gate 15 receives at its inputs the W ON output from the window generator 14 and a DW ON signal from the timing controller 24. The output from the OR gate 15 is supplied to the S terminal of the sync window flip-flop 6. The three-input OR gate 16 receives at its inputs the output from the data sync detector circuit 5, the W OFF output from the window generator 14, and a DW OFF signal from the timing controller 24. The output from the OR gate 16 is supplied to the R terminal of the sync window flip-flop 6.

The three-input OR gate 17 receives at its inputs the output from the data sync detector 5, the carry output (CY) from the PLL system counter 13, and a carry output (CY) from a crystal system counter 20. The output from the OR gate 17 is supplied to the CK terminal of a block counter 21. A two-input AND gate 18 is supplied at one input with the $\overline{Q}$ output from the data flag flip-flop 10 and at the other input with a CTG output from the timing controller 24. The output of AND gate 18 is supplied to the $E_2$ terminal of the crystal system counter 20.

The D input of the $W_2$ latch 19 is supplied with the output from the buffer latch 7, and the CK terminal is supplied with a $W_2$ CK output from the timing generator 12. The latch 19 produces an MSB signal that tells whether certain data is in the PCM or subcode area. This MSB signal is supplied to the timing controller 24. A "L" level MSB signal indicates that the data is in the PCM area, and a "H" level MSB signal indicates that the data is in the subcode area. If the data is in the PCM area, the 7 bits, in the low-order position constitute a block address. If the data is in the subcode area, the 4 bits in the loworder position make a block address.

The $E_1$ terminal of the crystal system counter 20 is supplied with the Q output from a reproduction flag latch 35 that indicates that the system is in a replay mode. The $E_2$ terminal of the system counter 20 is supplied with the output from the two-input AND gate 18, and the CK terminal is supplied with the $f_M$ output from the crystal oscillator 30. The counter 20 generates a carry for every 0.25 blocks and this carry output (CY) is supplied as an input to the three-input OR gate 17.

The block counter 21 controls the area on the format in which a variety of signals are recorded. The CK terminal of the block counter 21 is supplied with the output from the three-input OR gate 17, the E terminal with an ENB signal from the timing controller 24, the L terminal with a PCK signal from the timing generator 12, and the R terminal with a BLC TCL signal from the timing controller 24. The output from the block counter 21 is supplied to each of the timing controller 24, PCM data processing circuit 38, and subcode processing circuit 39.

The CK terminal of a state counter 22 is supplied with BLC TCL from the timing controller 24, the L terminal with an SL output from the timing controller 24, the D input with data from a data table 25, and the R terminal with an output from a phase inversion detector circuit 31 that is supplied with HSWP (A/$\overline{\text{B}}$) from a servo system and which outputs a signal having a pulse width of 1 $f_M$. The output from the state counter 22 is supplied to the timing controller 24.

The E terminal of a data protecting counter 23 is supplied with PCST from the timing controller 24, the R terminal with PCK from the timing generator 12, the D terminal with data from the timing controller 24, and the L terminal with PL which also comes from the timing controller 24.

The data table 25 stores data to be set in the state counter 22 if not a single sync or block address is correctly detected for the subcode, ATF or PCM area.

The timing controller 24 receives as inputs the output from the parity check circuit 8, the Q output from the data flag flip-flop 10, the MSB output from the $W_2$ latch 19, the outputs from the block counter 21 and the state counter 22, and a NOT D signal from the ATF processing circuit 37. The timing controller 24 outputs AW ON, AW OFF and rear/front signals, all of which are supplied to the ATF processing circuit 37. The timing controller 24 also outputs a BLC TCL signal which is supplied to each of a two-input OR gate 29, the R terminal of the block counter 21, and the CK terminal of the state counter 22.

The DW ON signal from the timing controller 24 is supplied as an input to the two-input OR gate 15, the DW OFF signal to the three-input OR gate 16, the DF OFF signal to the R terminal of the data flag flip-flop 10, the CTG signal to the two-input AND gate 18, PCST, data and PL to the data protecting counter 23, SL to the L terminal of state counter 22, and $A_0$ and $A_1$ to the data table 25 as data selection signals.

In addition to controlling various parts of the system, a system controller circuit 26 receives subcode data from the subcode processing circuit 39 and supplies a program number, time and other items of data to a display unit 27. A D/A converter 28 is supplied with data from the PCM data processing circuit 38 that has been subjected to error correction and deinterleaving. This data is converted to an analog signal in the converter 28 and thereafter supplied to an external circuit. The two-input OR gate 29 is supplied at one input with the output from the phase inversion detector circuit 31, and at the other input with BLC TCL from the timing controller 24. The output from the OR gate 29 is supplied to the R terminal of the crystal system counter 20. The timing controller 24 outputs a PCM CK signal which is used as a clock for transmitting PCM data and a block address to the PCM data processing circuit 38. The timing controller 24 also outputs a SUB CK signal which is used as a clock for transmitting PCM data and a block address to the subcode processing circuit 39.

The phase inversion detector circuit 31 is supplied with a head switching pulse HSWP (A/B̄) from a servo system and a signal having a pulse width equal to one clock period ($1/f_M = 1/9.4$ MHz) is produced at the output of the circuit 31 at each of the rise and fall times of HSWP (A/B̄). The output of the circuit 31 is supplied to each of the R terminal of the state counter 22, the two-input OR gate 29 and the S terminal of an initial flag latch 32. The initial flag latch 32 is supplied at the R terminal with CY output from an initial counter 33 and is turned on only when the output from the phase inversion detector circuit 31 is at a "H" level. The initial counter 33 is supplied at the CK terminal with $f_M$ from the crystal oscillator 30 and performs a counting operation when the initial flag latch 32 is on. The CY output of the initial counter 33 is supplied to the S terminal of a head touch window 34. The output of the head touch window 34 is supplied to the C terminal of the head touch detector circuit 36 to prohibit the head touch detecting operation of the circuit 36 as long as noise is produced at a head switching time. The output of the circuit 36 is supplied to the S terminal of the reproduction flag latch 35, from which an output that indicates that the system is in a replay mode is supplied to each of the $E_2$ terminal of the PLL system counter 13 and the $E_1$ terminal of the crystal system counter 20.

In the configuration described above, the PLL system counter 13, crystal system counter 20, block counter 21 and state counter 22 make up a system counter that provides for system control.

Figure 2:
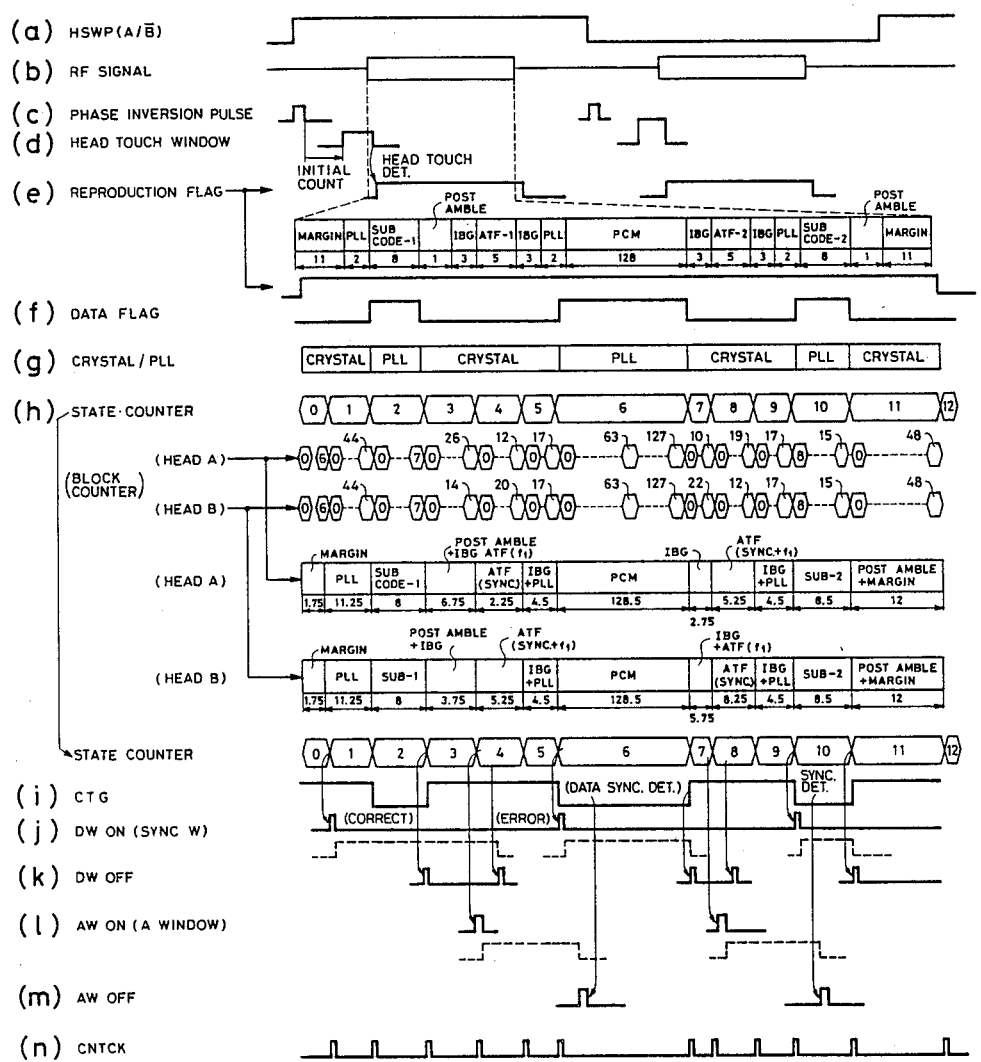
FIGS. 2A through N is a timing chart for the overall system.

The operation of the block address processing circuit having this configuration is hereinafter described with reference to FIG. 2 which is a timing chart for the overall system that generally depicts the waveforms of signals that appear in various parts of the system.

When the reproduction flag latch 35 is turned on (the "H" level of its Q output indicates that the system is in a replay mode), the Q̄ output of the data flag flip-flop 10 is at a "H" level and the CTG output from the timing controller 24 is also at a "H" level, so the two-input AND gate 18 is turned on, whereupon the crystal system counter 20 is enabled to produce a "H" level CY output for every 0.25 blocks, which is supplied to the CK terminal of the block counter 21 through the three-input OR gate 17.

The block counter 21 provides various counts depending upon the state of the state counter 22 and for each of these counts, the counter 21 is cleared in response to BLC TCL from the timing controller 24 and starts to count from zero. In this case, the state counter 22 counts up by an increment of one (1). When a count of one (1) is provided by the state counter 22, the DW ON pulse from the timing controller 24 is supplied to the S terminal of sync window flip-flip 6 through the two-input OR gate 15 and the flip-flop 6 produces a "H" level Q output. As a result, a "H" level input is supplied to the C terminal of the data sync detector circuit 5 which then starts to operate for data sync detection. If, in this case, correct data is recorded in the MARGIN area, no data sync will be detected for a count of one (1) provided by the state counter 22. Therefore, the counter 22 provides a count of two (2). When the counter 22 provides a count of two (2), the timing controller 24 produces a "L" level CTG and the two-input AND gate 18 also produces a "L" level output. Therefore, the crystal system counter 20 receives a "L" level input at the $E_2$ terminal and stops counting. At the same time, the timing controller 24 produces a "H" level PCST and the data protecting counter 23 receives a "H" level input at the E terminal. Therefore, the counter 23 starts a counting operation.

The data protecting counter 23 is supplied with data from the timing controller 24 in such a way that it counts for a duration of time corresponding to 8.5 blocks in the subcode area (i.e., the state counter 22 provides counts of 2 and 10), and for a duration of time corresponding to 128.5 blocks in the PCM area (i.e., the counter 22 provides a count of 6). When the data protecting counter 23 performs counting for a prescribed time on the basis of the data described above (namely, if not a single data sync is detected or if not a single correct parity check is made in spite of data recording in the subcode or PCM area), the state counter 22 is allowed to provide a count of 4, 8 or 11. If counts of 4 and 8 are provided, ATF processing is performed and the timing controller 24 sets 8 blocks in its interior so that the counts of 4 and 8 enable counting 8 blocks. The timing controller 24 also supplies an AW OFF signal to the ATF processing circuit 37 for achieving ATF sync detection. In the case under discussion, state counter 22 skips counting 3 and 5, so a broad ATF sync window is provided.

If a data sync is detected when the state counter 22 counts two (2), the data flag flip-flop 10 receives a rising signal at its S terminal and produces a "H" level Q output. In response to this Q output, both the synchronous counter 11 and the PLL system counter 13 become enabled. At the same time, the data flag flip-flop 10 produces a "L" level Q̄ output, thereby allowing the crystal oscillator 20 to stop operating.

Figure 3:
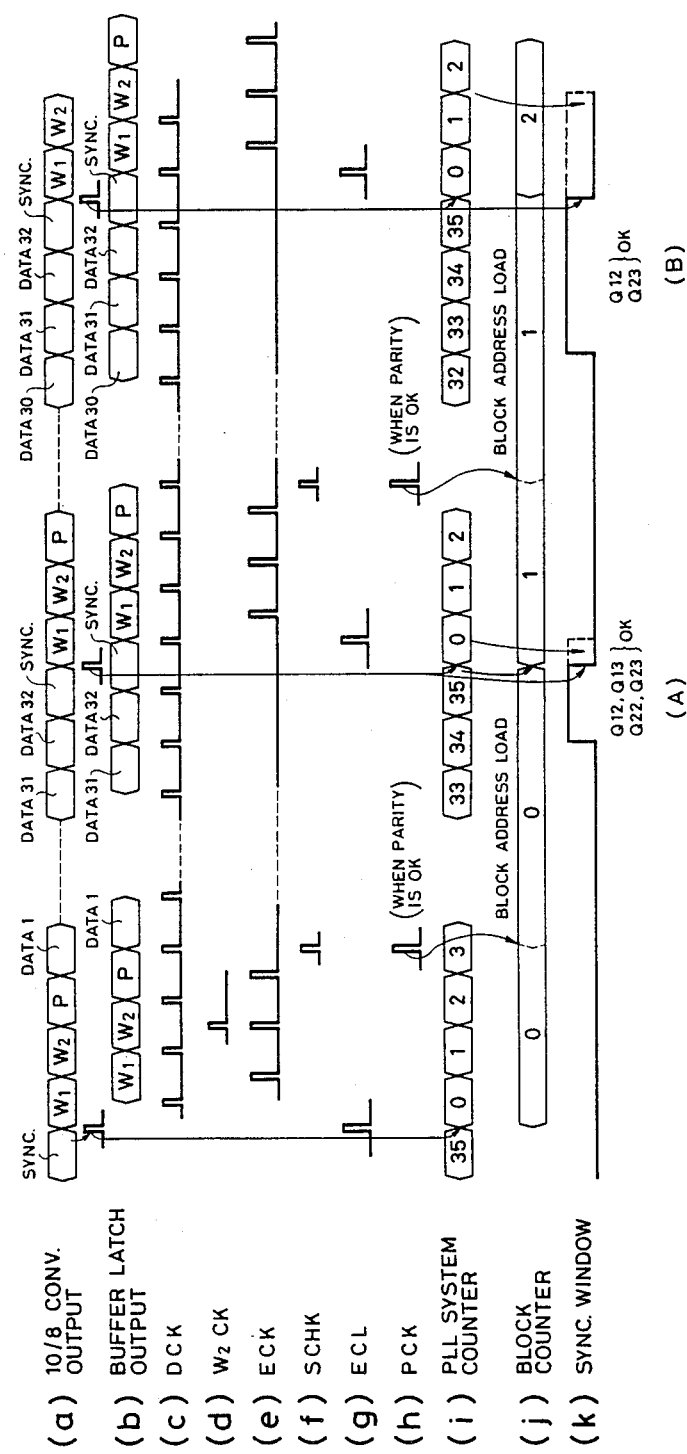
FIGS. 3A through K is a timing chart for a data sync and block address detecting unit.
Figure 4A:
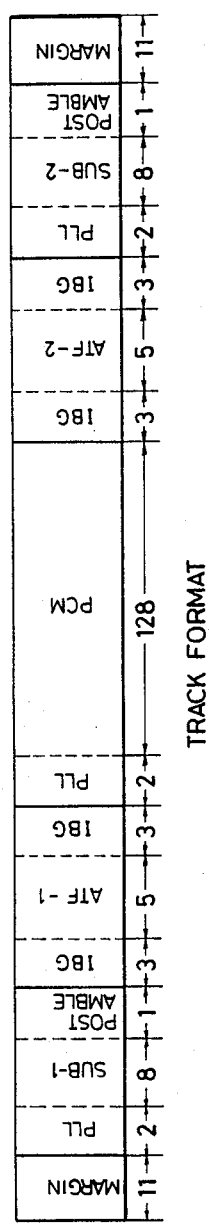
FIGS. 4A and B are diagrams showing the track format and block format for R-DAT.
Figure 4B:
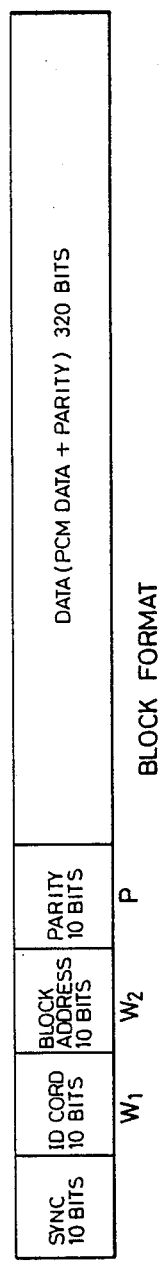
Figure 6A:
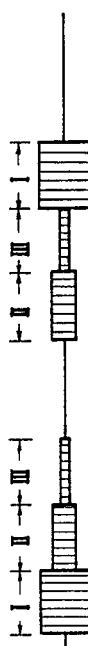
FIGS. 6A through C illustrate the theory of tracking control using the track pattern shown in FIG. 5.
Figure 6B:
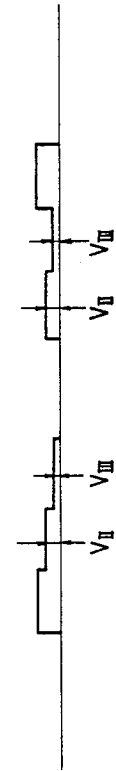
Figure 6C:
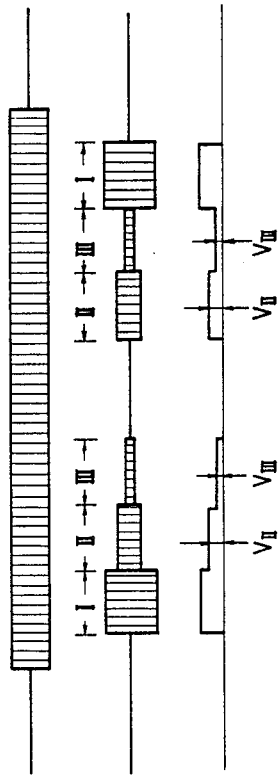
Figure 5:
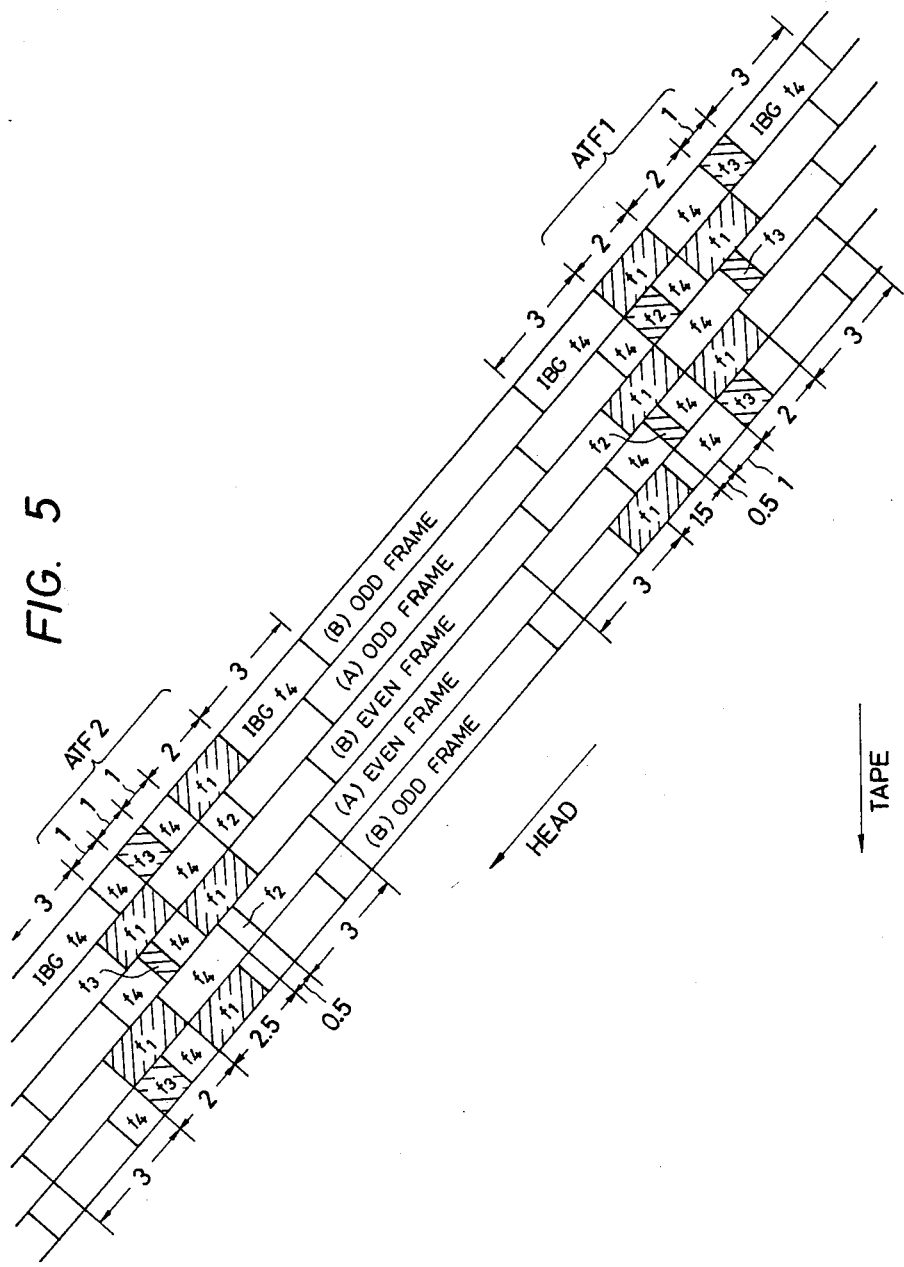
FIG. 5 is a diagram showing an ATF track pattern in R-DAT.

The CK terminal of the synchronous counter 11 is supplied with a clocking $f_M$ from the crystal oscillator 30 so as to transmit data in synchronism with the $f_M$ signal. Timing generator circuit 12 generates timing signals having the waveforms shown in FIG. 3. The buffer latch 7 produces an output that allows $W_2$ to be stored temporarily in the $W_2$ latch 19 at the timing determined by $W_2$ CK. The MSB output from the latch 19 is coded to provide for distinction between subcode and PCM. In the case of PCM, the bits on the seven low-order positions form a block address, and in the case of subcode, the bits on the four low-order positions make up a block address. The output of the $W_2$ latch 19 is supplied to the timing controller 24, from which the 7 low-order bits of PCM are all supplied to the $D_0$–$D_6$ inputs of block counter 21 while the 4 low-order bits of subcode and the remaining zeros are all supplied to the $D_0$–$D_6$ inputs of the block counter 21.

If the results of parity check made in the parity check circuit 8 are correct, it produces a "H" level output which is supplied to each of the timing generator 12 and the timing controller 24. The timing generator 12 generates a timing signal that sets a block address in the block counter in response to PCK. In other words, a block address recorded on the tape is set in the block counter 21 if said block address has been correctly read. If the results of parity check are not correct, the circuit 12 will not generate a PCK signal, so no block address will be set in the block counter 21. If the data flag flip-flop 10 produces a "H" level Q output (i.e., if data sync is detected and the result of parity check are correct), the internal lag of the timing controller 24 is turned on, which indicates the correctness of the data and parity check.

If a data sync is detected by the data sync detector circuit 5, the latter produces a "H" level output, whereupon the temporary storage latch in the state register 9 assumes a "H" level and both the synchronous counter 11 and the PLL system counter 13 are reset to their initial state. Following this detection of a data sync, another data sync is detected in the next block. So long as correct reading of data is achieved, the PLL system counter 13 will produce a CY output simultaneously with the output from the data sync detector circuit 5. Therefore, the output of the data sync detector circuit 5 is supplied to the block counter 21 through the three-input OR gate 17 and the counter 21 will count up. If the results of a parity check subsequently conducted are correct, a block address will be loaded. If a data sync is correctly detected with the results of a parity check being also correct, the block counter 21 will count up with contents that are equivalent to a block address being set in that counter.

If a data sync is not detected, the CY output of the PLL system counter 13 is supplied to the block counter 21 through the three-input OR gate 17 and the counter 21 will then count up. If, in this case, the results of a parity check are correct, a block address is set in the block counter 21. On the other hand, no such event will occur if the results of a parity check are not correct and the block counter 21 will hold a value that is counted up in response to the CY output from the PLL system counter 13 and which would be assumed to be equal to the block address.

If the PLL system counter 13 produces a CY output faster than an actual data sync, the block counter 21 will receive two count pulses and count them up to provide a count that differs from the actual count. This means the existence of a wrong clock address but the correct block address will be set if the results of a parity check are correct. Of course, no compensation will be achieved if the results of a parity check are not correct, but this possibility need not be considered since the probability of the occurrence of such a phenomenon, which is typically of the case where a large deviation in the PLL clock occurs one block before and a small dropout takes place between sync $W_1$ and P, is very small. If the results of a parity check are not correct, the correct block address will be later set to effect updating ("overwriting") of data (with an increased count having been provided by the block counter 21, setting the next block address will cause the counter to count down; therefore, the skipped block address data is wrong but can be corrected by a treatment of error correction).

Therefore, if the results of data sync detection or parity check are wrong in spite of the fact that a PLL clock closely follows data, the cause is the occurrence of a very short dropout or a low S/N ratio and if such is the case, ensuing data can be correctly read provided that the data and the clock are in phase with each other. In such a situation, the ensuing data is protected by means of compensation with a pseudo-block address in the block counter 21. Since the PLL system counter 13 closely follows data, it indicates the correct running position of tape and is operated with a detected block address set in it. Therefore, the correct position of data sync cannot be located by simple detection for the subcode area. A data sync of interest may be located on the second or third position in the data area, or alternatively, there is a high likelihood that the dat sync on the first position cannot be detected. However, it is possible to detect a block address in a correct manner.

In this case, the aforementioned system controlling counters closely follow the data since they are operated in response to a PLL clock produced by extracting a clock component from the data. Therefore, an ATF window can be readily formed with a precision not exceeding 0.25 blocks if the crystal system counter is driven from the point of time when data reading is completed. This mean that even if a false sync is present immediately before the true sync (i.e., within an area not exceeding 0.25 blocks) during overwriting, said false sync may be sampled without resulting in the sampling of incorrect crosstalk. To state this more specifically, one of the two adjacent crosstalks will exist in one block before or after the start of the true sync and sampling at a point 0.25 blocks before the true sync will be equivalent to sampling one of such adjacent crosstalks. Needless to say, if a false sync is present more than 0.25 blocks before the true sync, no sync detection will be performed because the window is off.

The operation of the window generator circuit 14 is described hereinafter. If all of the outputs from the state register 9 are at a "H" level, namely, if three consecutive data syncs are detected with the results of three parity checks being correct, the sync window in the flip-flop 6 is set so that it will have a width with a tolerance of ±5 clocks from the assumed sync position, as shown in FIG. 3(A). If a data sync is detected only in a block that immediately precedes the assumed sync position and if the results of a parity check are correct, the tolerance of window width is set to be 2 blocks before and after the assumed sync position, as shown in FIG. 3(B). If a data sync is not detected in the block that immediately precedes the assumed sync position, no window will be formed so that a data sync can be detected at any desired time.

A detected data sync is supplied to the R terminal of the flip-flop 6 through the three-input OR gate 16, and the flip-flop 6 produces a "L" level output Q (i.e., the flag is off). Therefore, the flip flop 6 is turned off when a data sync is detected but in the absence of any sync that is detected, the width of a window is controlled under the conditions offered in a previous state.

As described above, the window of a data sync window is controlled in accordance with the state of data reading. If data is correctly read from tape that is running in a steady manner, the width of the window is decreased to prevent erroneous detection of a data sync that results from the occurrence of noise or a very small dropout. If failure to detect a data sync occurs frequently, either no window is formed or a comparatively broad window is formed depending upon the specific state of sync detection, and this eliminates the possibility that a certain data sync fails to be detected by the window.

In principle, the data sync window, ATF sync window and the data window are turned off either after detection or after processing if each item of data is correctly read. If correct detection is not possible, a flag that is opposite to the different signal sync that is actually detected will be turned off. For instance, if not a single data sync is detected and if $SP_1$ (sampling signal) for ATF is actually detected, the data sync window is turned off. On the other hand, the ATF sync window is turned off if a data sync is detected. Therefore, depending on the case, both windows may be opened. Generally speaking, it is very rare that no data sync is detected in the subcode or PCM area but there is a certain possibility of the occurrence of such a phenomenon if a large dropout appears. Opening both windows is a measure that is taken to avoid this problem.

It should be noted here that the system counter will be operated in different manners (i.e., different counts are produced) depending upon whether head A or B is used for scanning.

According to one aspect of the present invention, the block address recorded in the subcode and PCM areas is read into a system counter and a sync window is formed with the system counter being compensated for each time this block address is read. A particular advantage that can be attained by the present invention is that an ATF sync window can be formed at a position 0.25 blocks before the position where the true ATF sync signal exists. Because of this feature, even if a sync signal is erroneously detected and sampled in such a case as where some sync signals remain unerased by overwriting, crosstalk can be sampled from one of the two adjacent tracks without causing the erroneously sampled value to be supplied to a servo system. As a result, the running position of the tape can be correctly detected.

As a further advantage, the width of a data sync window for detecting and protecting a data sync can be controlled in accordance with the state of signal reproduction, and this reduces the probability of erroneous detection of data sync by a sufficient degree to ensure correct reading of ensuing data.

If some difficulty is found in data sync detection, the width of the window may be increased to reduce the probability that the true sync signal is missed. If, in an extreme case, two or more sync signals fail to be detected, the window is turned off before the operation of data sync detection is started, thereby eliminating the chance of a sync signal being missed on account of the existence of the window. As a result, data can be correctly read in accordance with the present invention.

According to another aspect of the present invention, both an ATF sync window and a data sync window are opened at the time when the output of an RF signal is detected, and when either one of an ATF sync signal and a data sync signal is detected, the window for the other sync signal is turned off and only the window for said detected signal is controlled. This configuration enables the setting of a sync window having an appropriate width and the potential effects of jitter and dropouts can be sufficiently reduced to provide maximum protection against failure to read correct data.

According to still another aspect of the present invention, a system counter which forms a window for detecting and protecting a data sync or ATF sync is supplied with a clock that is switched in such a way that during the reproduction of a data region on the track format, the counter is operated in response to a clock that is extracted from a data train by a PLL circuit, whereas during the reproduction of a non-data region, the counter is operated in response to a clock supplied from a crystal oscillator. As a result, the position at which the tape is actually running can be correctly detected and a window can be formed with high precision.

In accordance with a further aspect of the present invention, the crystal system counter 20 stops operating at the point of time when the area to be reproduced is switched from the non-data area to the data area, and the data protecting counter 23 starts to operate by the time the PLL system counter 13 is set in action upon detection of a data sync. If the PLL system counter 13 starts to operate at a later time upon detection of a data sync, the data protecting counter 23 then stops operating. If no data sync is detected even after a prescribed period of time lapses for the counter 23 to count a predetermined value, the state counter 22 jumps to open the window for detecting and protecting an ATF sync, thereby actuating the ATF sync detecting operation.

If the first sync signal is detected and $SP_1$ (sampling signal) is output, the data sync window is turned off. If a data sync is detected when the data protecting counter 23 has counted a predetermined value and upword, a check is made as to whether the signal being reproduced is in the subcode or PCM area and the necessary steps of processing are executed. If, on the other hand, a prescribed sync is not detected even after a predetermined value has been counted by the block counter 21 in the processing of ATF, the data sync window is opened and the state counter 22 is set to a prescribed value. If a data sync is detected, the ATF sync window is turned off.

If the correct ATF sync is detected after the block counter 21 has counted a prescribed value, an ATF processing is performed. If both ATF sync and data sync signals are detected simultaneously with the associated respective windows being open, the processing of data has a priority and the ATF sync window is turned off in case the data sync is in complete agreement with the parity.

According to a further aspect of the present invention, if signals recorded on the positions where correct reading should be made cannot be read, the data protecting counter 23 and the block counter 21 will be operated to open data sync and ATF sync windows which serve to detect and protect the respective sync signals. Because of this feature, there will be no possibility that the existence of the two windows prevents detection of the correct sync signals, and it becomes possible to read both ATF and data in a correct manner.

In the system of the present invention, either one of the two windows is turned off only after the sync signal associated with the other window has been detected. The advantage of this feature is that even if no signal can be detected because of such factors as dropouts, satisfactory protection against noise can be realized without providing an undue tolerance for the width of each window.

Figure 7:
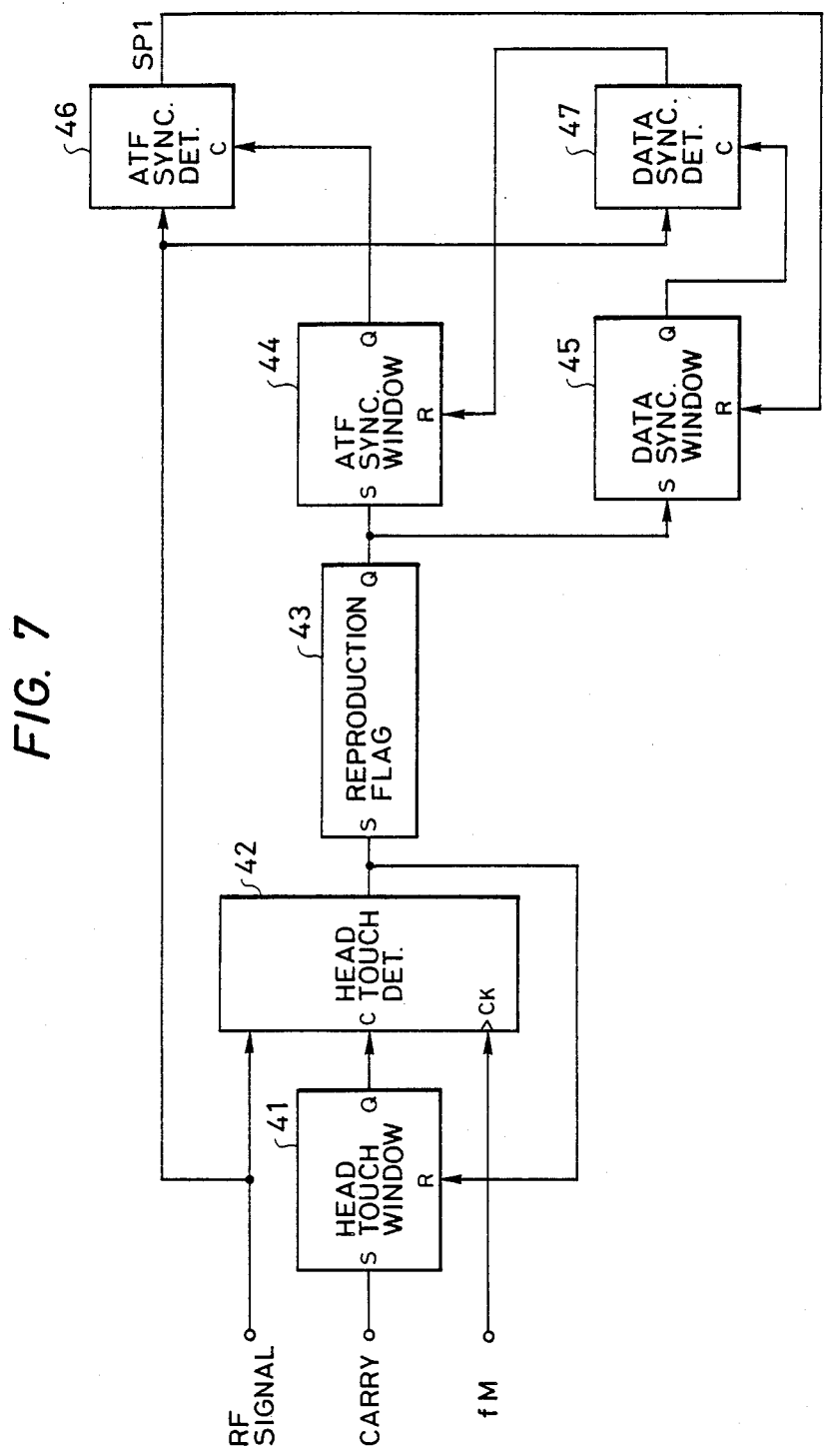
FIG. 7 is a block diagram of a digital signal reproducing apparatus according to another embodiment of the present invention.

FIG. 7 is a block diagram showing a digital signal reproducing apparatus according to another embodiment of the present invention. In the figure, head touch window flag latch 41 forms a window that prohibits the head touch detecting operation as long as noise is produced at a head switching time. Head touch detector circuit 42 detects an RF signal output as a result of contact established between tape and head. A reproduction flag generator circuit 43 outputs a reproduction flag which indicates that the system is in a replay mode.

An ATF sync window forming circuit 44 forms an ATF sync window that detects and protects a tracking ATF sync signal assuming the period during which said sync signal is reproduced in response to the above-mentioned reproduction flag. A data sync window forming circuit 45 forms a data sync window that detects and protects a data sync signal (which serves as a reference for reading data) assuming the period during which said sync signal is reproduced in response to the above-mentioned reproduction flag. An ATF sync detector circuit 46 detects an ATF sync signal from the RF signal while it is supplied with an ATF sync window from the circuit 44, with the detected ATF sync signal being supplied to the circuit 45 to turn off the data sync window. A data sync detector circuit 47 detects a data sync signal from the RF signal while it is supplied with a data sync window from the circuit 45, with the detected data sync signal being supplied to the circuit 44 to turn off the ATF sync window.

The operation of the apparatus shown in FIG. 7 will proceed as follows. The S terminal of the head touch window flag latch 41 is supplied with a carry output that assumes a "H" level only for the period during which noise or any other extraneous signal is produced at a head switching time. A window signal that assumes a "H" level only while the head touch detecting operation is prohibited is produced from the output Q of the latch 41 and supplied to the C terminal of the head touch detector circuit 42. The head touch detector circuit 42 is also supplied with an RF signal from the head and $f_M$ (9.4 MHz) from a crystal oscillator (not shown) which is the rate of transmission of channel bit data in R-DAT. The head touch detecting operation is prohibited while the Q output is supplied from the head touch window flag 41, but the circuit 42 will produce a "H" level output when it detects the output of an RF signal as a result of contact between tape and head.

The signal from the head touch detector circuit 42 which indicates the output of the RF signal is supplied to the S terminal of the reproduction flag generator circuit 43. This signal is also supplied as a reset signal to the R terminal of the head touch window flag latch 41. The reproduction flag generator circuit 43 is set by the output from the head touch detector circuit 42 and produces a "H" level Q output. This output serves as a reproduction flag which indicates that the system is in a replay mode and is supplied to the S terminal of each the ATF sync window forming circuit 44 and the data sync window forming circuit 45.

In response to the supply of the reproduction flag, the ATF sync window generator circuit 44 assumes the period over which an ATF sync signal is to be reproduced, outputs a window for detecting and protecting said ATF sync signal, and supplies it as an ATF sync window to the C terminal of the ATF sync detector circuit 46. Also, in response to the supply of the reproduction flag, the data sync window forming circuit 45 assumes the period over which a data sync signal is to be reproduced, outputs a window for detecting and protecting said data sync signal, and supplies it as a data sync window to the C terminal of the data sync detector circuit 47.

The ATF sync detector circuit 46 is supplied with an RF signal and while it is supplied at its C terminal with the ATF sync window from the circuit 44, said circuit 46 detects the beginning of the sync pattern from the RF signal and outputs SPI, which is supplied as a reset signal to the R terminal of the circuit 45, thereby turning off the data sync window. The data sync detector circuit 47 is also supplied with an RF signal and while it is supplied at its C terminal with the data sync window from the circuit 45, circuit 47 detects a data sync from the RF signal and outputs said data sync, which is supplied as a reset signal to the R terminal of the circuit 44, thereby turning off the ATF sync window.

As described above, when the head touch detector circuit 42 detects the output of an RF signal, both the ATF sync window from the circuit 44 and the data sync window from the circuit 45 are opened, and if either one of the ATF and data sync signals is detected under this condition, the window for the other signal is turned off and only the window for the detected signal is controlled.

In other words, upon detection of an ATF sync signal, the data sync window is turned off and only the ATF sync window is controlled, whereas upon detection of a data sync signal, the ATF sync window is turned off and only the data sync window is controlled.

The advantages of the digital signal reproducing apparatus of the present invention can be summarized as follows. First, a sync window having an appropriate width can be set and the potential effects of jitter and dropouts can be sufficiently reduced to provide maximum protection against failure to read correct data. Secondly, the width of a data sync window for detecting and protecting a data sync can be controlled in accordance with the state of signal reproduction, and this reduces the possibility of erroneous detection of data sync by a sufficient degree to ensure correct reading of ensuing data. Thirdly, if a certain difficulty is encountered in data sync detection, the width of the window may be increased to reduce the probability that the true sync signal is missed. If, in an extreme case, two or more sync signals fail to be detected, the window is turned off before the operation of data sync detection is started, thereby eliminating the chance of a sync signal being missed on account of the existence of the window. As a result, data can be correctly read. Fourthly, in accordance with the present invention, an ATF sync window can be formed at a position 0.25 blocks before the position where the true ATF sync signal exists. Because of this feature, even if a sync signal is erroneously detected and sampled in such a case as where some signals remain unerased by overwriting, crosstalk can be sampled from one of the two adjacent tracks without causing the erroneously sampled value to be supplied to a servo system. As a result, the running position of tape can be correctly detected. Fifthly, the position at which the tape is actually running can be correctly detected and a window can be formed with high precision.

What is claimed is:

1. In a digital signal reproducing apparatus having at least two rotary heads for reproducing a plurality of signals on a recording medium, said plurality of signals containing a digital signal, a tracking pilot signal composed of a frequency signal with a small azimuth-effect, and a sync signal, said plurality of signals being recorded on each of a plurality of helical tracks in a predetermined format with the recording region in one track being independent of the recording region in another track in the longitudinal direction, the positions of the pilot signals recorded on three consecutive tracks differing from one track to another, with the sync signal being recorded on a position corresponding to one of the two adjacent tracks, each of said rotary heads having a width greater than the width of each track on which it scans, each of said rotary heads outputting, as a result of reproduction of each track, the pilot signal on the on-track and the crosstalks of the pilot signals on the two adjacent tracks, and a capstan servo system being controlled by the difference between the levels of crosstalk of the pilot signals on said two adjacent tracks so as to ensure that said rotary heads will correctly scan each track, the improvement comprising:

- a head touch detector circuit that detects the output of an RF signal as a result of contact that is established between said recording medium and each of said rotary heads;
- a reproduction flag generator circuit which, in response to the output of said head touch detector circuit, indicates that the system is in a replay mode;
- an ATF sync window forming circuit which forms an ATF sync window that detects and protects a tracking ATF sync signal assuming the period during which said sync signal is reproduced in response to said reproduction flag; and
- a data sync window forming circuit which forms a data sync window that detects and protects a data sync signal which serves as a reference for reading data, assuming the period over which said sync signal is reproduced in response to said reproduction flag;
- both of said windows being opened at the time when said head touch detector circuit detects the output of an RF signal, and at the time when either one of said ATF and data sync signals is detected, the window for the other sync signal being turned off and only the window for said detected signal being controlled.

2. In a digital signal reproducing apparatus having at least two rotary heads for reproducing a plurality of signals on a recording medium, said plurality of signals containing a digital signal, a tracking pilot signal composed of a frequency signal with a small azimuth-effect, and a sync signal, said plurality of signals being recorded on each of a plurality of helical tracks in a predetermined format with the recording region in one track being independent of the recording region in another track in the longitudinal direction, the positions of the pilot signals recorded on three consecutive tracks differing from one track to another, with the sync signal being recorded on a position corresponding to one of the two adjacent tracks, each of said rotary heads having a width greater than the width of each track on which it scans, each of said rotary heads outputting, as a result of reproduction of each track, the pilot signal on the ontrack and the crosstalks of the pilot signals on the two adjacent tracks, and a capstan servo system being controlled by the difference between the levels of crosstalk of the pilot signals on said two adjacent tracks so as to ensure that said rotary heads will correctly scan each track, the improvement comprising:

- a system counter that forms a data sync window for detecting and protecting a data sync which serves as a reference for reading the data recorded on said format;
- the block address recorded in the subcode and PCM areas in said format being read into said system counter, said system counter being compensated for at each time this block address is read in such a way that the width of said window formed for detecting and protecting said data sync is controlled in accordance with the state of signal reproduction.

3. A digital signal reproducing apparatus according to claim 2 wherein said system controller which controls the width of said window is operated in response to a clock that is produced by extraction from a train of data on said format and which closely follows said data.

4. In a digital signal reproducing apparatus having at least two rotary heads for reproducing a plurality of signals on a recording medium, said plurality of signals containing a digital signal, a tracking pilot signal composed of a frequency signal with a small azimuth-effect, and a sync signal, said plurality of signals being recorded on each of a plurality of helical tracks in a predetermined format with the recording region in one track being independent of the recording region in another track in the longitudinal direction, the positions of the pilot signals recorded on three consecutive tracks differing from one track to another, with the sync signal being recorded on a position corresponding to one of the two adjacent tracks, each of said rotary heads having a width greater than the width of each track on which it scans, each of said rotary heads outputting, as a result of reproduction of each track, the pilot signal on the on-track and the crosstalks of the pilot signals on the two adjacent tracks, and a capstan servo system being controlled by the difference between the levels of crosstalk of the pilot signals on said two adjacent tracks so as to ensure that said rotary heads will correctly scan each track, the improvement comprising:

- a system counter that forms a data sync window and a sync window, said data sync window being used to detect and protect a data sync which serves as a reference for reading the data recorded on said format, and said sync window being used to detect and protect said tracking sync signal;
- said system counter being supplied with a clock that is switched in such a way that during the reproduction of a data region on said track format, said system counter is operated in response to a clock that is extracted from a data train by a PLL circuit and which closely follows said data, whereas during the reproduction of a non-data region, the counter is operated in response to a clock supplied from a crystal oscillator.

5. In a digital signal reproducing apparatus having at least two rotary heads for reproducing a plurality of signals on a recording medium, said plurality of signals containing a digital signal, a tracking pilot signal composed of a frequency signal with a small azimuth-effect, and a sync signal, said plurality of signals being recorded on each of a plurality of helical tracks in a predetermined format with the recording region in one track being independent of the recording region in another track in the longitudinal direction, the positions of the pilot signals recorded on three consecutive tracks differing from one track to another, with the sync signal being recorded on a position corresponding to one of the two adjacent tracks, each of said rotary heads having a width greater than the width of each track on which it scans, each of said rotary heads outputting, as a result of reproduction of each track, the pilot signal on the ontrack and the crosstalks of the pilot signals on the two adjacent tracks, and a capstan servo system being controlled by the difference between the levels of crosstalk of the pilot signals on said two adjacent tracks so as to ensure that said rotary heads will correctly scan each track, the improvement comprising:

a PLL system counter which, when the data region of said format is being reproduced, is operated in response to a clock that is extracted from a train of data by a PLL circuit and which closely follows said data, said PLL system counter being enabled after detection of a data sync that serves as a reference for data reading;

a crystal system counter which is operated in response to a clock from a crystal oscillator when the non-data region of said format is being reproduced;

a block counter which, when said crystal system counter is operating, detects and protects said tracking sync signal during said signal processing for the purpose of tracking;

a data protecting counter which, when the area to be reproduced is switched from said non-data region to the data region, is operated in response to a clock from said crystal oscillator while said crystal system counter is not in operation; and a state counter that identifies the signal reproduced from each of the regions in said format;

said data protecting detector being operated during the period over which said crystal system counter stops operating when said state counter outputs the indication that the data region is being reproduced and over which said PLL system counter stops operating in the absence of detection of said data sync, said tracking sync window being opened for setting said state counter in a processing mode for tracking if no data sync is detected even after a predetermined value is counted by said data protecting counter.

6. A digital signal reproducing apparatus according to claim 5 wherein if said tracking sync signal is not detected by the time said block counter counts a predetermined value in said processing mode for tracking, the window for said data sync is opened in a data processing mode.

7. A digital signal reproducing apparatus according to claim 5 wherein if one either of the tracking sync signal and the data sync signal is detected when both of said tracking sync window and said data sync window are open, the sync window or the other sync signal is turned off.

8. A digital signal reproducing apparatus according to claim 5 wherein if said tracking sync signal and said data sync signal are detected simultaneously, data processing has a priority in case the data sync is in agreement with the parity.

9. In a digital signal reproducing apparatus having at least two rotary heads for reproducing a plurality of signals on a recording medium, said plurality of signals containing a digital signal, a tracking pilot signal composed of a frequency signal with a small azimuth-effect, and a sync signal, said plurality of signals being recorded on each of a plurality of helical tracks in a predetermined format with the recording region in one track being independent of the recording region in another track in the longitudinal direction, the positions of the pilot signals recorded on three consecutive tracks differing from one track to another, with the sync signal being recorded on a position corresponding to one of the two adjacent tracks, each of said rotary heads having a width greater than the width of each track on which it scans, each of said rotary heads outputting, as a result of reproduction of each track, the pilot signal on the ontrack and the crosstalks of the pilot signals on the two adjacent tracks, and a capstan servo system being controlled by the difference between the levels of crosstalk of the pilot signals on said two adjacent tracks so as to ensure that said rotary heads will correctly scan each track, the improvement comprising:

a system counter which forms a window for detecting and protecting said tracking sync signal;

the block address recorded in the subcode and PCM areas in said format being read into said system counter, said system counter being compensated for at each time this block address is read, thereby forming a sync window for detecting said sync signal.

10. A digital signal reproducing apparatus according to claim 9 wherein said window is formed at a position one block before the position where said sync signal exists.

11. A digital signal reproducing apparatus according to claim 9 wherein said window is formed at a position 0.25 block before the position where said sync signal exists.

* * * * *